(12) United States Patent
Kikuchi

(10) Patent No.: US 10,897,553 B2
(45) Date of Patent: Jan. 19, 2021

(54) PRINT SYSTEM TO WHICH TWO INFORMATION PROCESSING APPARATUSES ARE CONNECTED, INFORMATION PROCESSING APPARATUS, CONTROL METHODS THEREFOR, AND STORAGE MEDIA STORING PROGRAMS FOR EXECUTING THESE CONTROL METHODS

(71) Applicant: CANON KABUSHIKI KAISHA, Tokyo (JP)

(72) Inventor: Shou Kikuchi, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/720,765

(22) Filed: Dec. 19, 2019

(65) Prior Publication Data

US 2020/0213470 A1 Jul. 2, 2020

(30) Foreign Application Priority Data

Dec. 28, 2018 (JP) ................................ 2018-247764

(51) Int. Cl.
  *H04N 1/00* (2006.01)
  *H04N 1/327* (2006.01)
  *G06F 3/12* (2006.01)

(52) U.S. Cl.
  CPC ....... *H04N 1/32747* (2013.01); *G06F 3/1204* (2013.01); *G06F 3/1236* (2013.01);
  (Continued)

(58) Field of Classification Search
  CPC ... H04N 2201/0094; H04N 2201/0036; H04N 2201/0039; H04N 1/32747; H04N 1/00962; G06F 3/1236; G06F 3/1204
  (Continued)

(56) References Cited

U.S. PATENT DOCUMENTS 8,384,949 B2    2/2013  Ooba
2006/0164679 A1*  7/2006  Kim ..................... G06F 3/1261
                                          358/1.15

FOREIGN PATENT DOCUMENTS

JP    2008210103 A    9/2008
JP    2009020810 A    1/2009

* cited by examiner

*Primary Examiner* — Saeid Ebrahimi Dehkordy
(74) *Attorney, Agent, or Firm* — Rossi, Kimms & McDowell LLP

(57) ABSTRACT

A print system that is capable of performing a network setting operation easily in a case where two information processing apparatuses are connected. A first network connects first and second information processing apparatuses to an external apparatus. A second network that connects the first and second information processing apparatuses to exchange information for print management. The second information processing apparatus displays a first setting screen on which a user inputs network configurations of the first and second information processing apparatuses for the first network, changes the network configuration of the second information processing apparatus for the first network into the network configuration input by the user, and transmits the network configuration input by the user to the first information processing apparatus through the second network. The first information processing apparatus changes the network configuration of the first information processing apparatus for the first network into the network configuration transmitted.

20 Claims, 20 Drawing Sheets

(52) U.S. Cl.
CPC . *H04N 1/00962* (2013.01); *H04N 2201/0036* (2013.01); *H04N 2201/0039* (2013.01); *H04N 2201/0094* (2013.01)

(58) Field of Classification Search
USPC ........................................................ 358/1.15
See application file for complete search history.

*FIG. 6*

| IPv4 Address | | | | |
|---|---|---|---|---|
| DFE: ○ Auto ● Manual | | MFP: ○ Auto ● Manual | | |
| IPv4 Address Setting | | IPv4 Address Setting | | |
| 192.168.137.11 | | 192.168.134.22 | | |
| Subnet Mask | | Subnet Mask | | |
| 255.255.248.0 | | 255.255.248.0 | | |
| Default Gateway | | Default Gateway | | |
| 192.168.137.254 | | 192.168.134.254 | | |
| | | | Setting Completion | Cancel |

IPv4 Address — 801

DFE: ○ Auto  ● Manual

IPv4 Address Setting
[ 192.168.137.11 ]

Subnet Mask
[ 255.255.248.0 ]

Default Gateway
[ 192.168.137.254 ]

MFP: ○ Auto  ● Manual

IPv4 Address Setting
[ 192.168.134.22 ]

Subnet Mask
[ 255.255.248.0 ]

Default Gateway
[ 192.168.134.254 ]

[ Setting Completion ]  [ Cancel ]

| 1 | 2 | 3 | 4 | 5 | 6 | 7 | 8 | 9 | 0 |
| Q | W | E | R | T | Y | U | I | O | P |
| A | S | D | F | G | H | J | K | L |
| Z | X | C | V | B | N | M | , | . | / |

[ Ctrl ] [ Alt ]  [ Space ]  [ Shift ]

*FIG. 9*

IPv4 Address

DFE: ○ Auto ● Manual

IPv4 Address Setting 192.168.137.11

Subnet Mask 255.255.248.0

Default Gateway 192.168.137.254

MFP: ◌ Auto ◌ Manual

IPv4 Address Setting

Subnet Mask

Default Gateway

Setting Completion | Cancel

| IPv4 Address | MFP: Setting configuration is reflected after connecting. |

DFE: ○ Auto ● Manual     MFP: ○ Auto ● Manual

IPv4 Address Setting
[ 192.168.137.11 ]

IPv4 Address Setting
[ 192.168.137.22 ]

Subnet Mask
[ 255.255.248.0 ]

Subnet Mask
[ 255.255.248.0 ]

Default Gateway
[ 192.168.137.254 ]

Default Gateway
[ 192.168.134.254 ]

[ Setting Completion ]  [ Cancel ]

FIG. 15

NETWORK CONFIGURATION CHANGING PROCESS (MFP)

S1701: ASCERTAIN CONNECTION?
 - NO → END
 - YES → S1702: TRANSMIT NETWORK CONFIGURATION TO CONNECTED APPARATUS → END

```
IPv4 Address                    Setting error: IP address are competed.    1901

DFE:      ○ Auto  ● Manual      MFP:      ○ Auto  ● Manual

IPv4 Address Setting             IPv4 Address Setting
   192.168.137.11                   192.168.137.11

Subnet Mask                      Subnet Mask
   255.255.248.0                    255.255.248.0

Default Gateway                  Default Gateway
   192.168.137.254                  192.168.137.254

[Setting Completion]  [Cancel]
```

| IPv4 Address | ☑ Connect to the same subnet. |

DFE: ○ Auto ● Manual    MFP: ○ Auto ● Manual

IPv4 Address Setting: 192.168.137.11
IPv4 Address Setting: 192.168.137.22

Subnet Mask: 255.255.248.0
Subnet Mask: 255.255.248.0

Default Gateway: 192.168.137.254
Default Gateway: 192.168.137.254

[ Setting Completion ]  [ Cancel ]

2301

US 10,897,553 B2

PRINT SYSTEM TO WHICH TWO INFORMATION PROCESSING APPARATUSES ARE CONNECTED, INFORMATION PROCESSING APPARATUS, CONTROL METHODS THEREFOR, AND STORAGE MEDIA STORING PROGRAMS FOR EXECUTING THESE CONTROL METHODS

BACKGROUND OF THE INVENTION

Field of the Invention

The present invention relates to a print system to which two information processing apparatuses are connected, an information processing apparatus, control methods therefor, and storage media storing programs causing a computer to execute these control methods.

Description of the Related Art

Many of printers, scanners, facsimile machines, or multi function printers (hereinafter referred to as MFPs) complexly provided with those functions are provided with a network communication function in recent years. An MFP equipped with the communication function communicates with a server or a PC on a network, and enables functions, such as scan data transmission to the PC from the MFP and gathering of information about the MFP by the server.

In the meantime, a professional-use product for a printing company or a design office is required to perform advanced print control processes, such as image processes and scheduling of a print job, than an office-oriented product. In response to the requirement, a digital front end controller (hereinafter referred to as a DFE) is connected to an MFP in many cases. Usually, a DFE is installed between a network to which a server and a PC are connected and an MFP. When a DFE is connected between a network and an MFP, the MFP cannot communicate on the network. There is a suggested method that transfers a network packet form an MFP through a DFE so that the MFP can normally communicate with a device connected to a network eve when a DFE is connected to the MFP (for example, see Japanese Laid-Open Patent Publication (Kokai) No. 2008-210103 (JP 2008-210103A)).

Moreover, an MFP equipped with a plurality of network interfaces is required in recent years. This is regarded as important because there is a requirement to separate a network treating confidential information from a network used by a general user and a requirement to separate an I/F used for various data communications in a cooperation function with a cloud from an I/F treating a print job.

Moreover, since the packet transfer method disclosed in the above publication is needed to perform for every protocol in order that the MFP communicates with an external server or a cloud service in a print system to which a DFE is connected, this might become a technical restriction. Accordingly, a support for a plurality of network interfaces by an MFP is regarded as important also in a print system to which a DFE is connected, and a connection method therefor is suggested (for example, see Japanese Laid-Open Patent Publication (Kokai) No. 2009-20810 (JP 2009-20810A)).

However, when an MFP has a network interface for connecting with a DFE and a network interface for connecting with a network used for connecting an external device directly, a network setting operation, which was conventionally performed on only the DFE, is necessary to be performed on the MFP too. In this way, when it is necessary to perform the network setting operation on both the DFE and MFP, management and operation become complicated.

SUMMARY OF THE INVENTION

The present invention provides a print system, an information processing apparatus, control methods therefor, and storage media storing control programs causing a computer to execute these control methods, which are capable of performing a network setting operation easily in a case where two information processing apparatuses are connected to the print system.

Accordingly, a first aspect of the present invention provides a print system including a first network that connects first and second information processing apparatuses to an external apparatus, a second network that connects the first information processing apparatus to the second information processing apparatus in order to exchange information for print management, the second information processing apparatus including a memory device that stores a set of instructions, and at least one processor that executes the set of instructions to display a first setting screen on which a user inputs network configurations of the first and second information processing apparatuses for the first network, change the network configuration of the second information processing apparatus for the first network into the network configuration input by the user in a case where the user inputs the network configuration of the second information processing apparatus for the first network on the first setting screen, and transmit the network configuration input by the user to the first information processing apparatus through the second network in a case where the user inputs the network configuration of the first information processing apparatus for the first network on the first setting screen, and the first information processing apparatus including a memory device that stores a set of instructions, and at least one processor that executes the set of instructions to change the network configuration of the first information processing apparatus for the first network into the network configuration transmitted in a case where the network configuration is transmitted from the second information processing apparatus through the second network.

Accordingly, a second aspect of the present invention provides an information processing apparatus including a first connector that connects to another information processing apparatus and an external apparatus mutually through a first network, a second connector that connects to the other information processing apparatus through a second network that is used to exchange information for print management, a memory device that stores a set of instructions, and at least one processor that executes the set of instructions to display a first setting screen on which a user inputs network configurations of the information processing apparatus and the other information processing apparatus for the first network, change the network configuration of the information processing apparatus for the first network into the network configuration input by the user in a case where the user inputs the network configuration of the information processing apparatus for the first network on the first setting screen, and transmit the network configuration input by the user to the other information processing apparatus through the second network in a case where the user inputs the network configuration of the other information processing apparatus for the first network on the first setting screen.

Accordingly, a third aspect of the present invention provides a control method for a print system in which first and second information processing apparatuses are connected to an external apparatus through a first network and the first information processing apparatus is connected to the second information processing apparatus through a second network that is used to exchange information for print management, the control method including displaying a first setting screen on which a user inputs network configurations of the first and second information processing apparatuses for the first network on the second information processing apparatus, changing the network configuration of the second information processing apparatus for the first network into the network configuration input by the user in the second information processing apparatus in a case where the user inputs the network configuration of the second information processing apparatus for the first network on the first setting screen, transmitting the network configuration input by the user to the first information processing apparatus from the second information processing apparatus through the second network in a case where the user inputs the network configuration of the first information processing apparatus for the first network on the first setting screen, and changing the network configuration of the first information processing apparatus for the first network into the network configuration transmitted in the first information processing apparatus in a case where the network configuration is transmitted through the second network.

Accordingly, a fourth aspect of the present invention provides a control method for an information processing apparatus that is connected to another information processing apparatus and an external apparatus through a first network and is connected to the other information processing apparatus through a second network that is used to exchange information for print management, the control method including displaying a first setting screen on which a user inputs network configurations of the information processing apparatus and the other information processing apparatus for the first network, changing the network configuration of the information processing apparatus for the first network into the network configuration input by the user in a case where the user inputs the network configuration of the information processing apparatus for the first network on the first setting screen, and transmitting the network configuration input by the user to the other information processing apparatus for the first network through the second network in a case where the user inputs the network configuration of the other information processing apparatus for the first network on the first setting screen.

Accordingly, a fifth aspect of the present invention provides a non-transitory computer-readable storage medium storing a control program causing a computer to execute the control method of the third aspect.

Accordingly, a sixth aspect of the present invention provides a non-transitory computer-readable storage medium storing a control program causing a computer to execute the control method of the fourth aspect.

According to the present invention, the network setting operation is easily performed in the case where each of the two information processing apparatuses connected is provided with a plurality of network interfaces.

Further features of the present invention will become apparent from the following description of exemplary embodiments with reference to the attached drawings.

BRIEF DESCRIPTION OF THE DRAWINGS

FIG. 6 is a view showing an example of a network setting UI (User Interface) displayed on the DFE concerning a first embodiment.

FIG. 8 is a view showing an example of a network setting UI displayed on the MFP concerning the first embodiment.

FIG. 9 is a view showing an example of a network setting UI displayed on a DFE concerning a second embodiment.

FIG. 14 is a view showing an example of a network setting UI displayed on a DFE concerning a fifth embodiment.

FIG. 15 is a flowchart showing a network configuration changing process in an MFP concerning the fifth embodiment.

FIG. 18 is a view showing an example of a network setting UI displayed on a DFE concerning a seventh embodiment.

FIG. 19 is a view showing a modified example of the network setting UI displayed on the DFE concerning the seventh embodiment.

DESCRIPTION OF THE EMBODIMENTS

Figure 1:
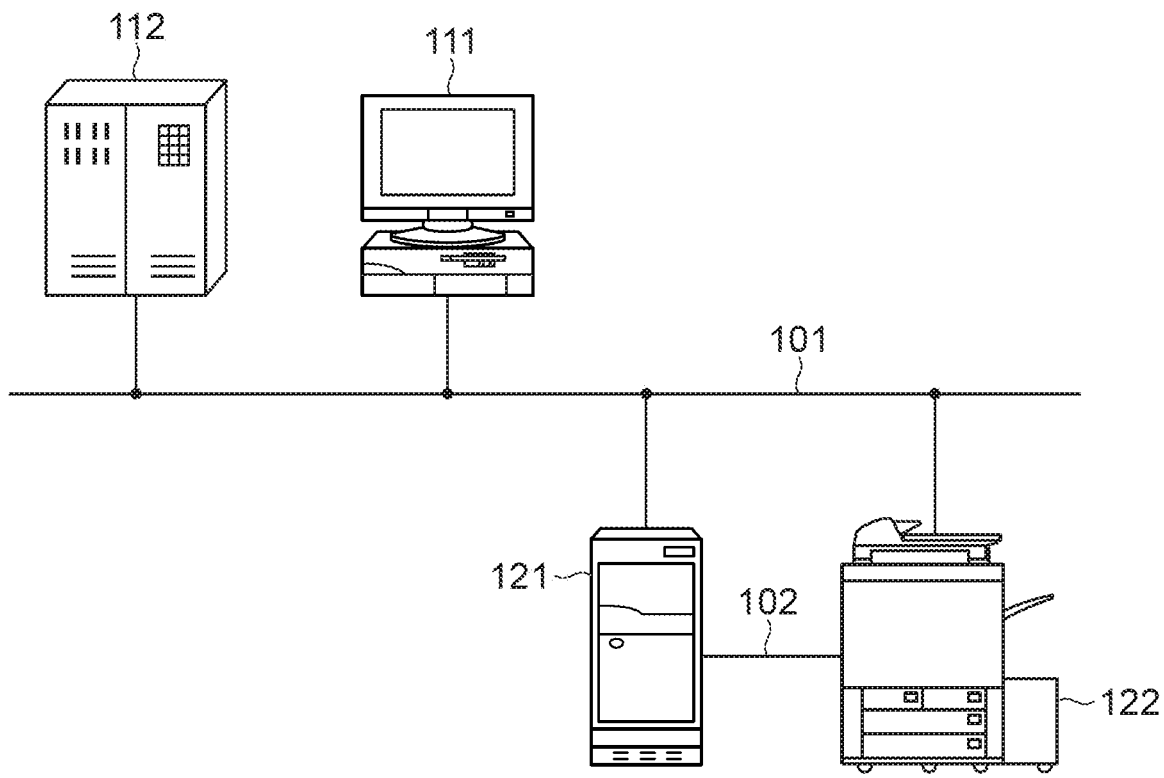
FIG. 1 is a view showing a configuration example of a print system concerning the present invention.

Hereafter, embodiments according to the present invention will be described in detail by referring to the drawings. It should be noted that configurations shown in the following embodiments are mere examples and the present invention is not limited to the illustrated configurations.

Hereinafter, a print system to which each embodiment is applicable will be described first. FIG. 1 is a view showing a configuration example of the print system concerning the present invention.

The print system has an MFP 122 (an information processing apparatus, a print processing apparatus) 122, a DFE (an information processing apparatus, a print controller) 121, a client PC 111, and an external server 112 that are connected through a first network 101. Moreover, the DFE 121 and MFP 122 are connected through a second network 102. The MFP 122 and DFE 121 have information about a network configuration for connecting to the second network 102 beforehand. In the meantime, a network configuration for connecting the MFP 122 and DFE 121 to the first network 101 is set on the basis of a user input to a network setting UI (network setting screen) mentioned later.

The second network 102 is used for exchanging information about print management. Specifically, print setting information, setting information about the MFP 122, a status of boot or print of the MFP 122, a sheet setting, and management information about an apparatus are exchanged through the second network 102. It should be noted that the second network 102 may be a single network or a plurality of networks as long as the function of the present invention is executable.

In this print system, the client PC 111 transmits print jobs to the DFE 121 through the first network 101. The DFE 121 applies a rasterizing process to the print jobs received from the client PC 111 in order and transfers the processed jobs to the MFP 122. Furthermore, the MFP 122 applies a necessary process to the print jobs transferred from the DFE 121 and prints out to a sheet.

Moreover, the DFE 121 has a packet transfer function that enables the MFP 122 to communicate with the external server 112 that has a function of a file server and the client PC 111. Accordingly, the MFP 122 can communicate with the external server 112 and the client PC 111 through the DFE 121.

Moreover, communications with the MFP 122 from the client PC 111 and the external server 112 are available through the first network 101. This enables the client PC to use a function of the MFP 122 and enables the MFP 122 to transmit data to the external server 112 without going through the DFE 121.

Figure 2:
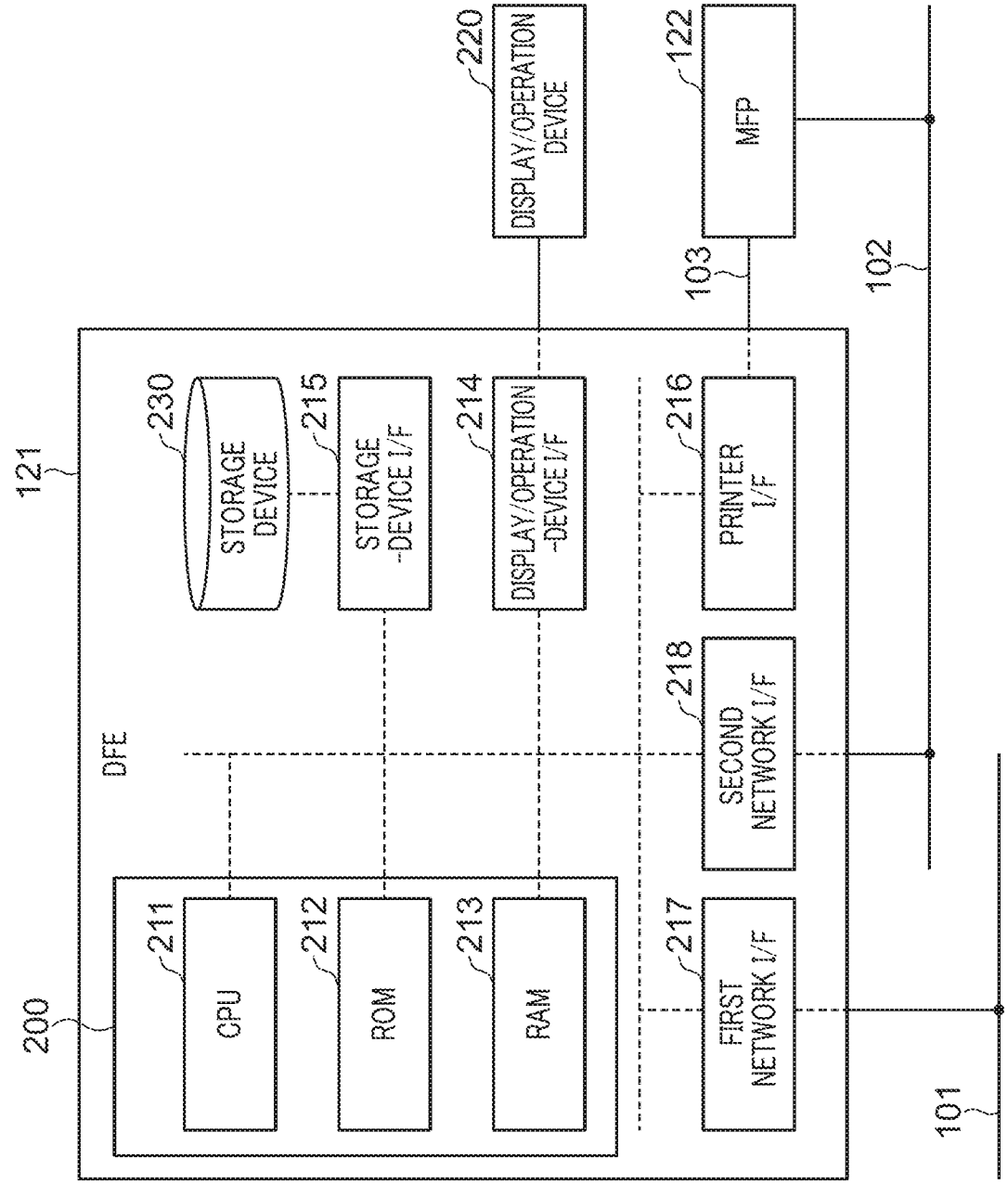
FIG. 2 is a block diagram showing a hardware configuration of a DFE in FIG. 1.

FIG. 2 is a block diagram showing a hardware configuration of the DFE 121 in FIG. 1. The DFE 121 has a controller 200 equipped with a CPU 211, ROM 212, and RAM 213.

Moreover, the DFE 121 is provided with a display/operation device 220, display/operation-device I/F 214, storage device 230, storage-device I/F 215, printer I/F 216, first network I/F 217, and second network I/F 218. Various control programs are stored in the ROM 212, and are read to the RAM 213 if needed, and are run by the CPU 211.

The DFE 121 connects to the first network 101 through the first network I/F 217, and connects to the second network 102 through the second network I/F 218. Moreover, the DFE 121 transfers image data of a print job to the MFP 122 through a video cable 103 from the printer I/F 216.

The DFE 121 exchanges data with the client PC 111, external server 112, and MFP 122 through the first network 101, and exchanges data with the MFP 122 through the second network 102. However, the DFE 121 exchanges a print image with the MFP 122 using the printer I/F 216.

The storage unit 230 that is controlled by the storage-device I/F 215b stores data received from the client PC 111 and MFP 122. The display/operation-device OF 214 changes the information currently displayed on the display/operation device 220 in accordance with a user's operation, the status of the DFE 121, etc.

Figure 3:
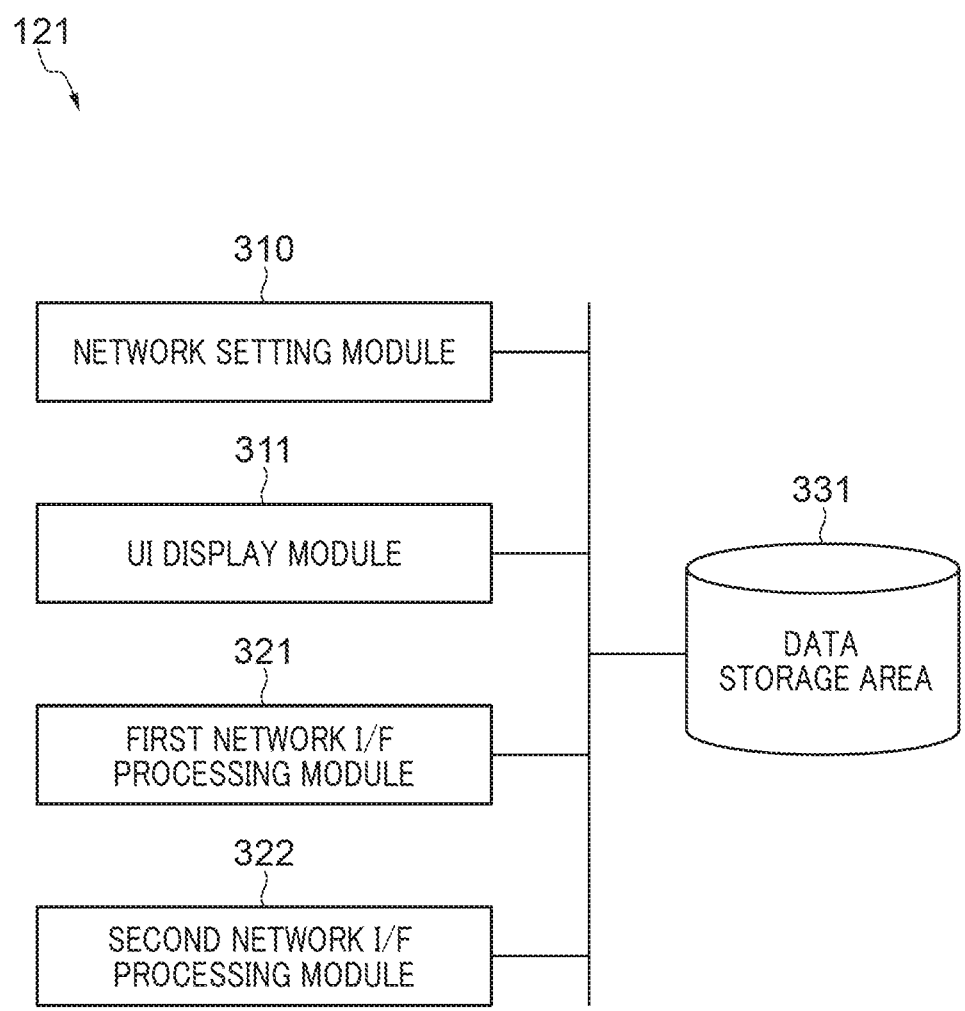
FIG. 3 is a block diagram showing software modules of the DEF.

FIG. 3 is a block diagram showing software modules of the DEF 121. Each software module is stored in a data storage area 331 in the ROM 212 of the DFE 121 as a program, is read to the RAM 213 if needed, and is run by the CPU 211.

A first network I/F processing module 321 and second network I/F processing module 322 are executed by the CPU 211. The first network I/F processing module 321 transmits and receives data to and from the client PC111, external server 112, and MFP 122 through the first network 101 by controlling the first network I/F 217. Moreover, the second network I/F processing module 322 transmits and receives data to and from the MFP 122 through the second network 102 by controlling the second network I/F 218.

The network setting module 310 sets setting values, which are set by a user using a UI of the DFE 121, to the DFE 121 and MFP 122. Moreover, the network setting module 310 sets a network configuration received from the MFP 122 to the DFE 121. The UI display module 311 generates and controls a GUI, such as a setting UI and a print status screen in the DFE 121.

Figure 4:
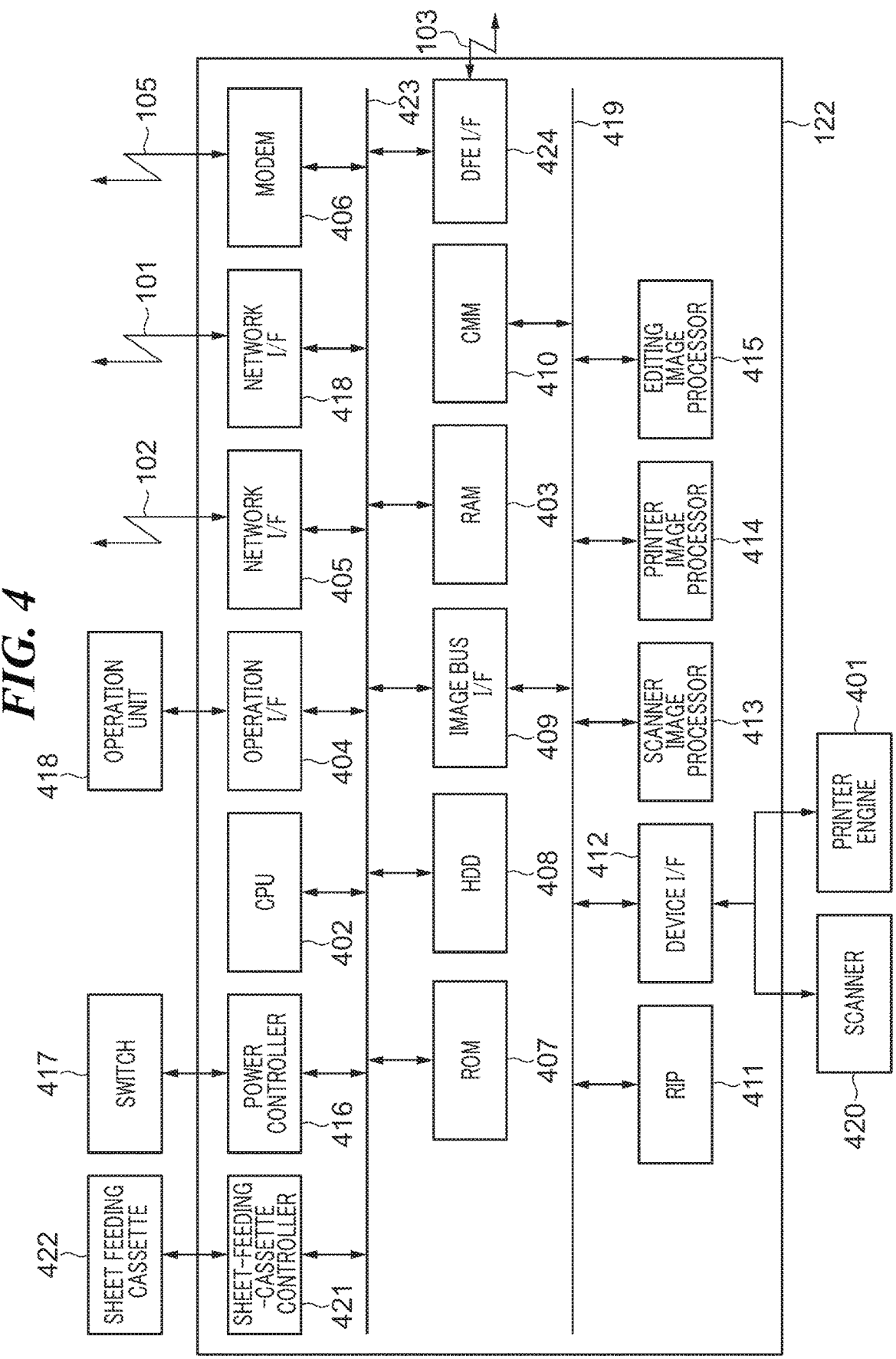
FIG. 4 is a block diagram showing a hardware configuration of an MFP in FIG. 1.

FIG. 4 is a block diagram showing a hardware configuration of the MFP 122 in FIG. 1.

The MFP 122 connects to a scanner 420 as an image input device and a printer engine 401 as an image output device, and controls reading and printing of image data. Moreover, the MFP 122 connects to the first network 101, the second network 102, and a telephone line 105, and controls input and output of image information and device information through the various networks.

A CPU 402 is a central processing unit for controlling the entire MFP 122. A RAM 403 is a system work memory used when the CPU 402 executes various processes, and is also an image memory for storing image data temporarily. A ROM 407 is a boot ROM that stores a boot program of a system used when the CPU 402 executes various processes.

An HDD (a hard disk drive) 408 stores input image data and software of the system used when the CPU 402 executes various processes.

An operation I/F 404 is an interface for an operation unit 418 that has a display screen on which image data etc. is displayed and outputs operation screen data to the operation unit 418. Moreover, the operation I/F 404 transfers information input by an operator through the operation unit 418 to the CPU 402.

A network I/F 405 and network I/F 418 are achieved by LAN cards, for example, and are connected to external apparatuses through networks to input and output information.

A modem 406 is connected to an external apparatus through the telephone line 105 and inputs and outputs information. A DFE I/F 424 is connected to the video cable 103 and receives image data of a print job transferred from the DFE 121. The above units are arranged on a system bus 423.

An image bus I/F 409 is an interface for connecting the system bus 423 with an image bus 419 that transmits image data at a high speed, and is a bus bridge that converts a data structure.

A raster image processor (RIP) 411, a device IT 412, a scanner image processor 413, a printer image processor 414, an editing image processor 415, and a color management module (CMM) 410 are connected to the image bus 419.

The RIP 411 develops page description language (PDL) to a raster image. The device I/F 412 converts image data input from the scanner 420 or image data output to the printer engine 401 between a synchronizing system and an asynchronous system. Moreover, the scanner image processor 413 applies various processes, such as correction, processing, and editing, to the image data input from the scanner 420.

The printer image processor 414 applies processes, such as correction and conversion of resolution, to the image data so as to be suitable for the printer engine 401. The editing image processor 415 performs various image processes, such as rotation of image data and compression/decompression of image data.

The CMM 410 is a dedicated hardware module that applies a color conversion process (it is also called a color space conversion process) to image data on the basis of a profile or calibration data. The profile is information like a function for converting color image data expressed in a color space depending on the apparatus into a color space (for example, Lab) independent of the apparatus. The calibration data is data for correcting a color reproduction characteristic of the scanner 420 or the printer engine 401 in the MFP 122.

A switch 417 receives a user's operation to turn OFF and ON of the power source. When the switch 417 is operated, a power controller 416 interrupts the process executed by the CPU 402. When the CPU 402 detects interruption, the CPU 402 controls the power controller 416 according to a power supply state of the MFP 122.

A sheet-feeding-cassette controller 421 is a module that controls sheet setting information and feeding of a sheet for a sheet feeding cassette 422. The sheet feeding cassette controller 421 holds setting information from the operation unit 418 and sheet paper information detected by the sheet feeding cassette 422, and controls the feed feeding cassette 422 to feed a sheet that a print job uses at the time of printing.

Figure 5:
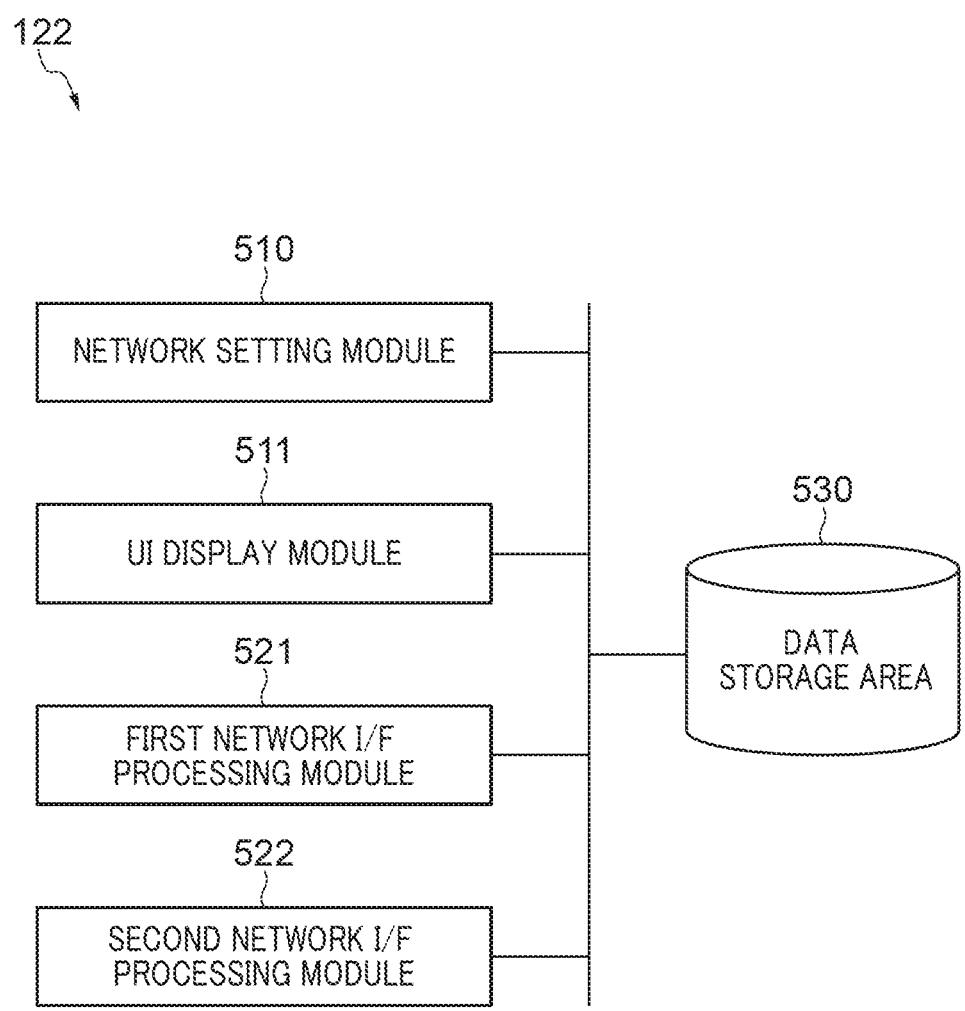
FIG. 5 is a block diagram showing software modules of the MFP.

FIG. 5 is a block diagram showing software modules of the MFP 122. Each software module is stored in a data storage area 530 in the ROM 407 of the MFP 122 as a program, is read to the RAM 403 if needed, and is run by the CPU 402.

A first network I/F processing module 521 and second network I/F processing module 522 are executed by the CPU 402. The first network I/F processing module 521 and the second network I/F processing module 522 transmit and receive data to and from the external server 112, client PC 111, and DFE 121 through the first network 101 and the second network 102.

The network setting module 510 sets setting values, which are set by a user using a setting UI displayed on a display screen of the operation unit 418, to the DFE 121 and MFP 122. Moreover, the network setting module 510 sets a network configuration, which is received from the DFE 121, to the MFP 122.

The UI display module 511 generates and controls GUIs, such as a setting UI and a print status screen that are displayed on the display screen of the operation unit 418.

Figure 7:
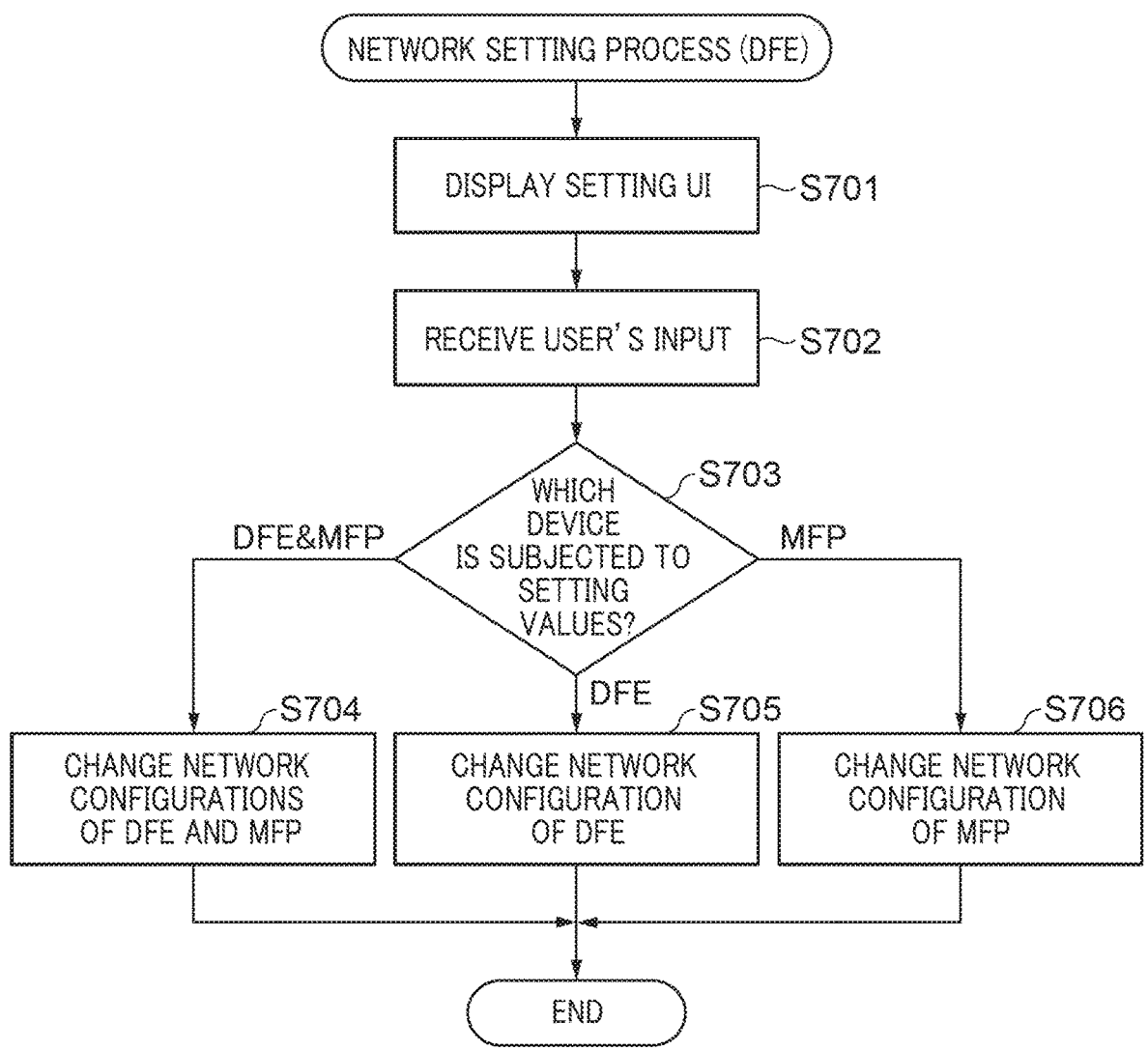
FIG. 7 is a flowchart showing a network setting process in the DFE concerning the first embodiment.

A first embodiment of the present invention will be described using FIG. 6, FIG. 7, FIG. 8, and FIG. 21. FIG. 6 is a view showing an example of a network setting UI displayed on the DFE 121 concerning the first embodiment. FIG. 7 is a flowchart showing a network setting process in the DFE 121 concerning the first embodiment. FIG. 8 is a view showing an example of a network setting UI displayed on the MFP 122 concerning the first embodiment.

Figure 21:
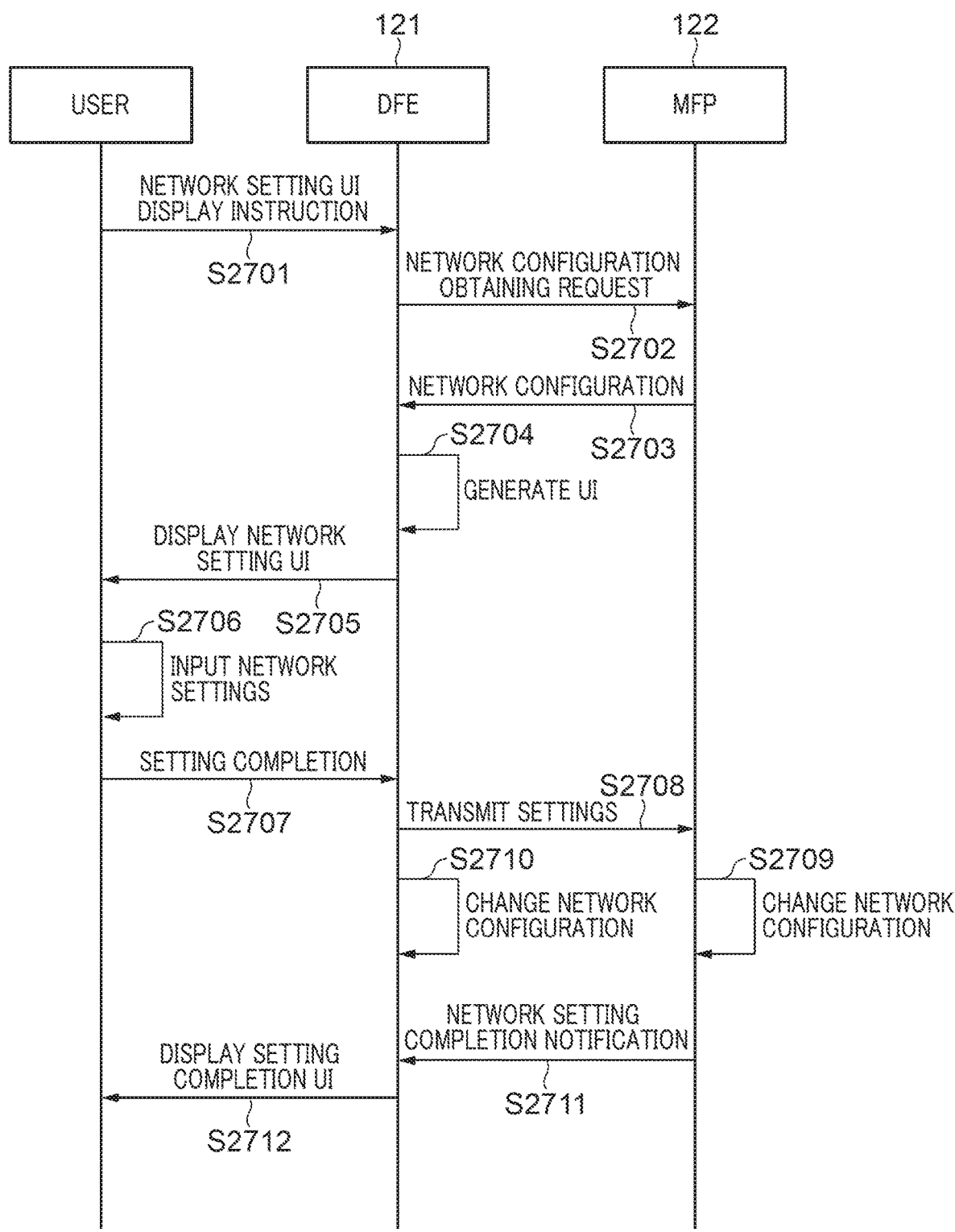
FIG. 21 is a sequence chart showing a flow of the network setting process in the first embodiment.

FIG. 21 is a sequence chart showing a flow of the network setting process in the first embodiment. At the DFE side, the control program of the network setting process described in FIG. 21 is stored in the ROM 212 of the DFE 121, is read to the RAM 213, and is run by the CPU 211. Moreover, at the MFP side, the control program is stored in the ROM 407 of the MFP 122, is read to the RAM 403, and is run by the CPU 402.

The entire flow of the first embodiment will be described using FIG. 21. A user instructs the DFE 121 to display the setting UI including the network setting UI (step S2701).

When receiving the display instruction in the step S2701, the DFE 121 transmits a network configuration obtaining request to the MFP 122 (step S2702).

When receiving the network configuration obtaining request, the MFP 122 replies the network configuration of the MFP 122 to the DFE 121 in step S2703.

In step S2704, the DFE 121 generates the network setting UI in FIG. 6 on the basis of the network configuration received from the MFP 122. Thereby, current setting values (network settings) come to be displayed in network setting columns for the MFP 122 in FIG. 6.

The DFE 121 displays the network setting UI on the display/operation device 220 in step S2705. The user inputs the network settings to the network setting UI displayed on the display/operation device 220 and selects a setting completion button in step S2706.

When detecting the selection of the setting completion button by the user in step S2707, the DFE 121 determines that the input of the network settings by the user has been completed and receives the network settings input into the network setting UI.

The DFE 121 transmits the network settings about the MFP 122 from among the network settings received in the step S2706 to the MFP 122 in step S2708.

The MFP 122 changes the network configuration according to the network settings received from the DFE 121 in step S2709. The MFP 122 informs the DFE 121 that the network setting operation has been completed by transmitting a network setting completion notification to the DFE 121 in step S2711. Strictly speaking, the MFP 122 only obtains the changed network settings in this stage and the changed network settings will be reflected to the network configuration after rebooting the MFP 122.

In step S2710, the DFE 121 changes the network configuration according to the network settings about the DFE 121 from among the network settings received in the step S2706. Strictly speaking, the DFE 121 only obtains the changed network settings in this stage and the changed network settings will be reflected to the network configuration after rebooting the DFE 121.

When receiving the setting completion notification from the MFP 121 in the step S2711 and detecting that the changed settings have been reflected in the step S2710, the DFE 121 proceeds with the process to step S2712.

In the step S2712, the DFE 121 displays a setting completion UI showing that the network setting operations for the DFE 121 and MFP 122 have been completed on the display/operation device 220, and this process is completed.

Next, a flow of the network setting process of the DFE 121 in the first embodiment will be described using a flowchart shown in FIG. 7.

When receiving the display instruction of the setting UI from the user, the UI display module 311 executes the steps S2701 through S2705 and displays the setting UI in step S701. The user can set perform the network setting operations for the DFE 121 and MFP 122 on the setting UI. Specifically, when the user instructs displaying the network setting UI on the setting UI, the network setting UI shown in FIG. 6 is displayed. On the network setting UI, the network configurations of the DFE 121 and MFP 122 are settable on one screen.

When the setting completion button in FIG. 6 is pressed, the UI display module 311 receives the user input on the network setting UI displayed in the step S701. The received input values are passed to the network setting module 310 as the network settings for the DFE 121 and MFP 122.

The network setting module 310 determines which apparatus (device) is subjected to the setting values passed from the UI display module 311 in step S703. When both the DFE 121 and MFP 122 are subjected to the setting values, the process proceeds to step S704. When the DFE 121 is subjected to the setting values, the process proceeds to step S705. When only the MFP 122 is subjected to the setting values, the process proceeds to step S706.

The network setting module 310 changes the network configuration about the DFE 121 in the step S704 on the basis of the setting values for the DFE 121 from among the setting values passed from the UI display module 311. Moreover, the network setting module 310 transmits the setting values for the MFP 122 to the MFP 122 through the second network 102. Then, this process is finished. The network setting module 510 of the MFP 122 changes the network configuration about the MFP 122 on the basis of the setting values transmitted from the network setting module 310.

The network setting module 310 changes the network configuration about the DFE 121 in the step S705 on the basis of the setting values passed from the UI display module 311, and finishes this process.

The network setting module 310 transmits the setting values for the MFP 122 to the MFP 122 through the second network 102, and finishes this process. The network setting module 510 of the MFP 122 changes the network configuration about the MFP 122 on the basis of the setting values transmitted from the network setting module 310.

The network setting module 510 may set the network configurations of the DFE 121 and MFP 122 by displaying the network setting UI on the MFP 122. In such a case, a network setting UI shown in FIG. 8 is displayed on the MFP 122. Since an operation on the MFP 122 is detected with a touch panel, a software keyboard is used for a user input to the network setting UI and the network configurations about the DFE 121 and MFP 122 are changed on the basis of the input values.

Moreover, user inputs may be allowed to both of the DFE 121 and MFP 122 by displaying the network setting UI in FIG. 6 on the DFE 121 and displaying the network setting UI in FIG. 8 on the MFP122.

As described above, the first embodiment enables changes of the network configurations of the both apparatuses by operating one of the DFE 121 and MFP 122. Moreover, the network setting operation is easily performed even when the MFP 122 holds a plurality of interfaces.

Next, a second embodiment of the present invention will be described using FIG. 9 and FIG. 10. It should be noted that a unit or a module that is the same as that in the first embodiment is denoted by the same reference number and an overlapped description is omitted.

FIG. 9 is a view showing an example of a network setting UI displayed on the DFE 121 concerning the second embodiment. FIG. 10 is a flowchart showing a network setting process in the DFE 121 concerning the second embodiment.

Figure 10:
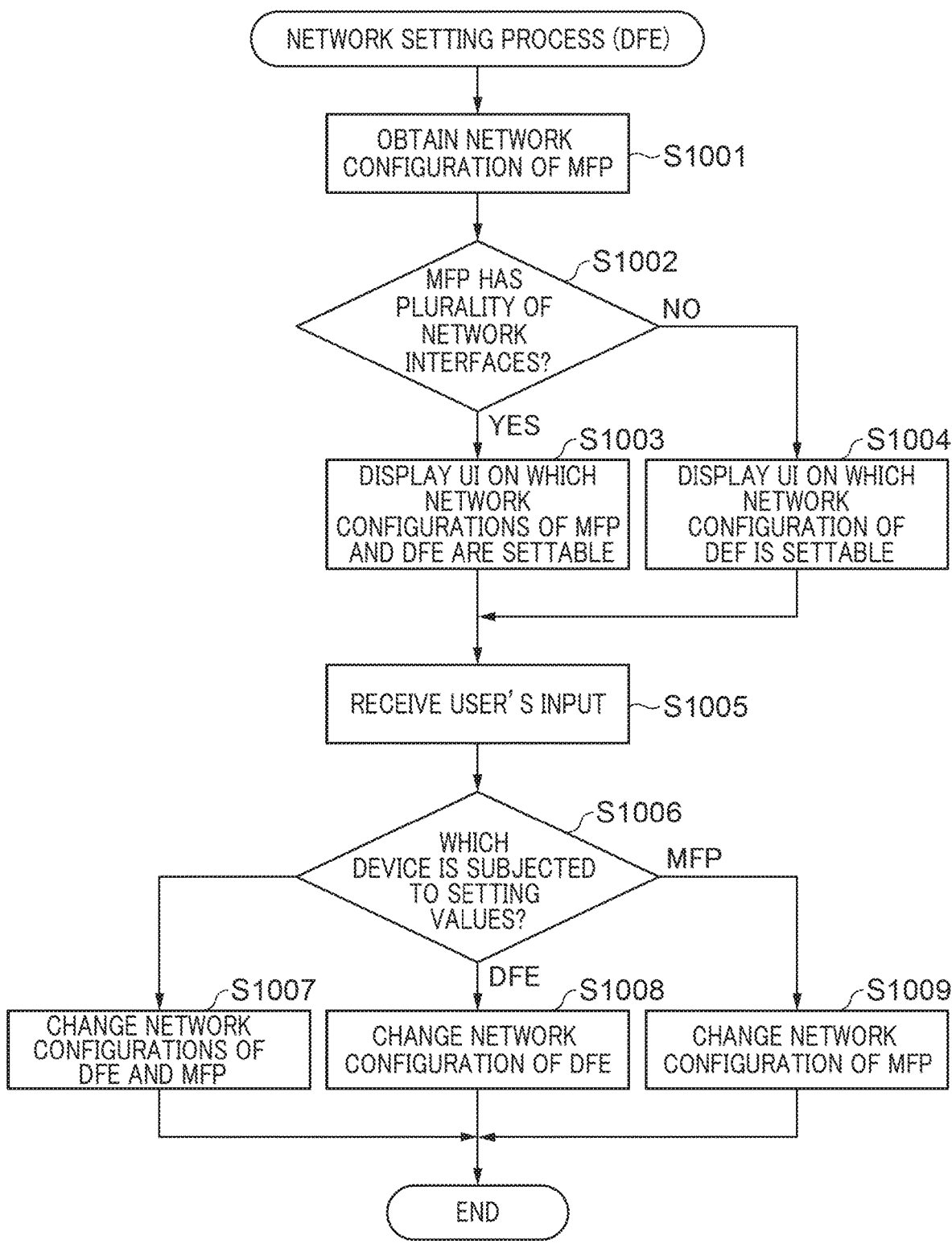
FIG. 10 is a flowchart showing a network setting process in the DFE concerning the second embodiment.

A control program of the network process described in FIG. 10 is stored in the ROM 212 of the DFE 121, is read to the RAM 213, and is run by the CPU 211. In addition, this process starts when the UI display module 311 receives a display instruction of the setting UI from a user and notifies the network setting module 310 of that (not shown in FIG. 10).

The network setting module 310 obtains the network configuration of the MFP 122 through the second network 102 in step S1001.

The network setting module 310 ascertains the network configuration of the MFP 122 obtained in the step S1001 and determines whether the MFP 122 holds a plurality of network I/Fs in step S1002. When the MFP 122 holds a plurality of network I/Fs, the process proceeds to step S1003 and a UI on which the network configurations of the DFE 121 and MFP 122 are settable is displayed. This UI is similar to the network setting UI shown in the FIG. 6 described in the first embodiment. In the meantime, when there is only one network I/F, the process proceeds to step S1004 and a UI on which only the network configuration of the DFE 121 is settable is displayed. Specifically, a network setting UI shown in FIG. 9 is displayed.

It should be noted that what kind of network configuration of the MFP 122 concludes the determination that the MFP 122 holds a plurality of network I/Fs in the step S1002 does not matter. For example, it may be determined that the MFP 122 holds a plurality of I/Fs in a case of detecting that the AQP 122 holds a plurality of network I/Fs physically or in a case of detecting that the MFP 122 holds an unused network I/F. Moreover, the UI displayed in the step S1004 may gray out the network setting columns for the MFP 122 like the network setting UI shown in FIG. 9 or may not display the network setting columns for the MFP 122.

Since the processes in steps S1005 through S1009 are identical to the processes in the steps S702 through S706 in the first embodiment, their descriptions will be omitted.

The network setting module 510 may set the network configurations of the DFE 121 and MFP 122 by displaying the network setting UI on the MFP 122. In such a case, the network setting module 510 determines whether the MFP 122 holds a plurality of I/Fs. As a result, when it is determined that the MFP 122 holds only one network I/F, the network setting module 510 displays a network setting UI that is configured by adding the software keyboard to the network setting UI in FIG. 9 on the MFP 122. This is because the MFP 122 receives an operation through the touch panel. The network setting module 510 changes the network configuration of the DFE 121 on the basis of the entered values by transmitting the entered values on the network setting UI to the DFE 121.

As described above, the second embodiment enables switching of the settable items on the UI according to whether the MFP 122 holds a plurality of I/Fs. Thereby, even when the MFP 122 does not have a plurality of I/Fs, the user is able to set the network configuration without mistaking the settable items.

Next, a third embodiment of the present invention will be described using FIG. 11 and FIG. 12.

Figure 11:
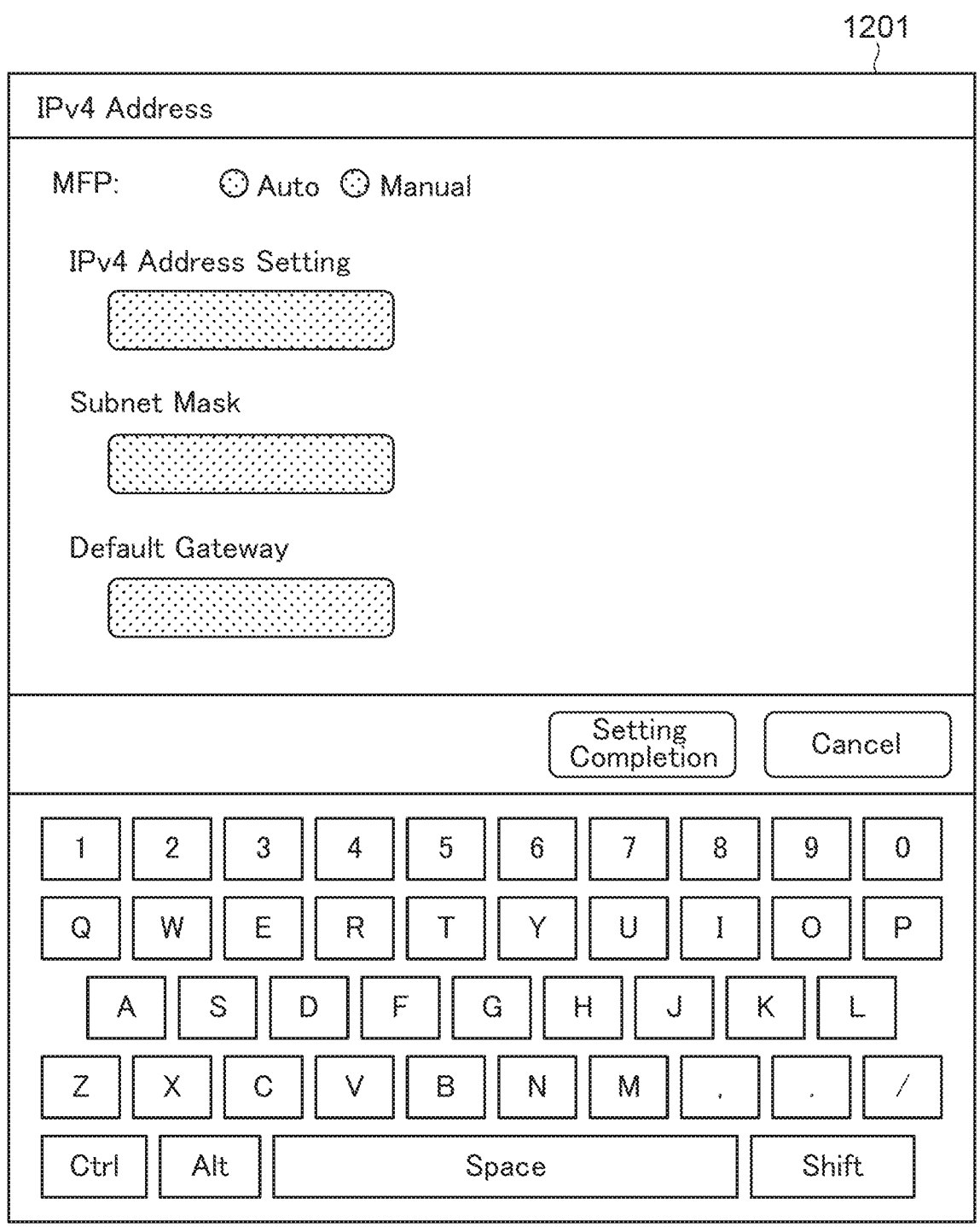
FIG. 11 is a view showing an example of a network setting UI displayed on an MFP concerning a third embodiment.

FIG. 11 is a view showing an example of a network setting UI displayed on the MFP 122 concerning the third embodiment. FIG. 12 is a flowchart showing a UI masking process in the MFP 122 concerning the third embodiment.

Figure 12:
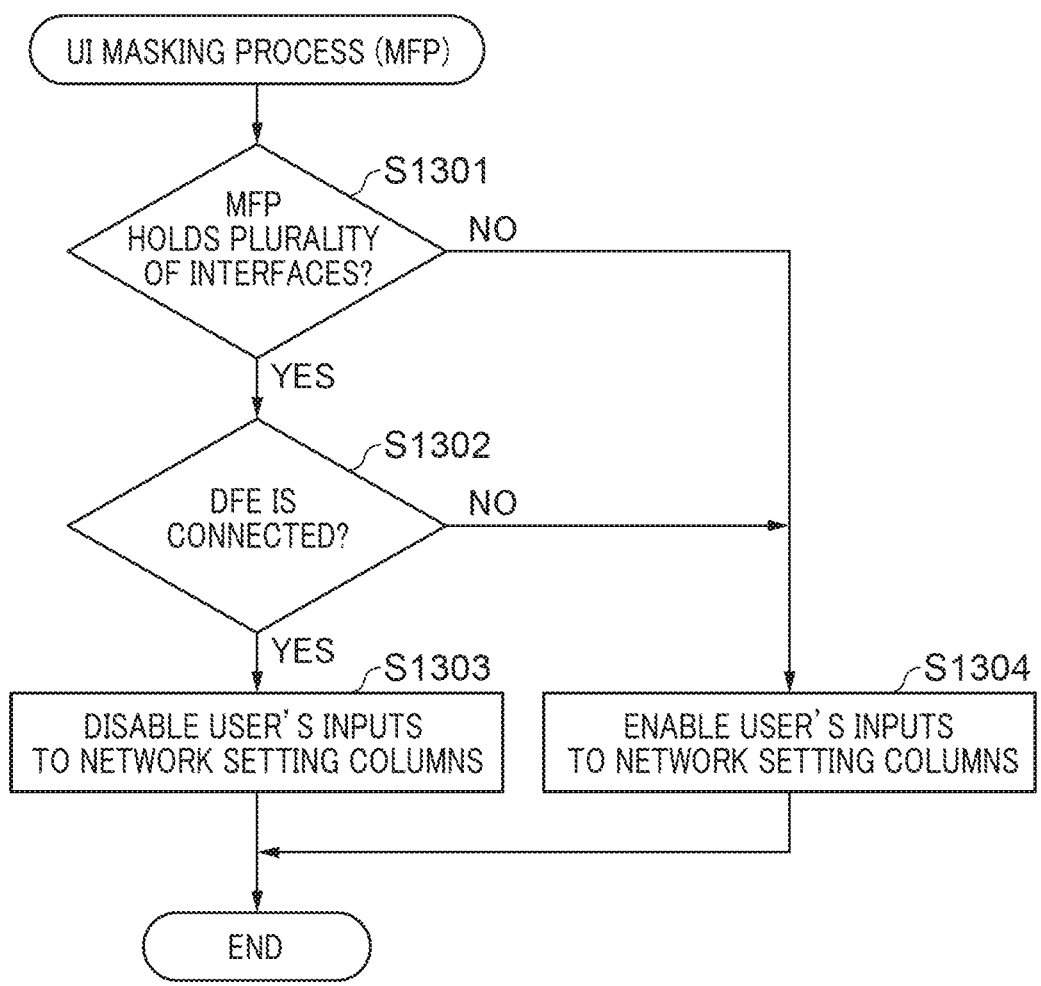
FIG. 12 is a flowchart showing a UI masking process in the MFP concerning the third embodiment.

A control program of the UI masking process described in FIG. 12 is stored in the ROM 407 of the MFP 122, is read to the RAM 403, and is run by the CPU 402.

The UI display module 511 determines whether the MFP 122 holds a plurality of network I/Fs in step S1301. As a result, when it is determined that a plurality of network I/Fs are held, the process proceeds to step S1302. In the meantime, when it is determined that only one network OF is held, the UI display module 511 proceeds with the process to step S1304, enables user inputs to the network settings of the MFP 122 at the side of the MFP 122, and finishes this process.

The UI display module 511 determines whether the DFE 121 is connected to the MFP 122 in the step S1302. As a result, when it is determined that the DFE 121 is connected, the UI display module 511 proceeds with the process to step S1303, disables user inputs to the network setting columns for the MFP 122 at the side of the MFP 122, and finishes this process. While the user inputs to the network settings of the MFP 122 at the side of the MFP 122 are disabled in this way, a network setting UI as shown in FIG. 11 is displayed on the operation unit 418 of the MFP 122 when the user instructs display of the network setting UI at the side of the MFP 122. That is, the UI in which all the user input columns are grayed out (masked) is displayed. Since the MFP 122 receives an operation through the touch panel, a software keyboard is used for inputs of the settings.

In the meantime, when it is determined the DFE 121 is not connected, the UI display module 511 proceeds with the process to step S1304, enables user inputs to the network setting columns for the MFP 122 at the side of the AQP 122, and finishes this process. While the user inputs to the network settings of the MFP 122 at the side of the MFP 122 are enabled in this way, the normal network setting UI is displayed on the operation unit 418 of the MFP 122 when the user instructs display of the network setting UI at the side of the MFP 122. That is, the UI of which the user input columns are not masked so as to allow user inputs is displayed.

It should be noted that what kind of network configuration of the MFP 122 concludes the determination that the MFP 122 holds a plurality of network I/Fs in the step S1301 does not matter. For example, it may be determined that the MFP 122 holds a plurality of I/Fs in a case of detecting that the MFP 122 holds a plurality of network I/Fs physically or in a case of detecting that a plurality of network I/Fs are used (are available) in the MFP 122.

Moreover, as long as the user is notified that the network setting operations for the DFE 121 and MFP 122 are integrated to the DFE 121, a UI displayed in the step S1303 is not limited to the network setting UI of which all the user input columns are grayed out as shown in FIG. 11. For example, a UI displaying a message showing that the network setting operation for the MFP 122 is impossible may be displayed in place of the network setting UI. Moreover, such a message may be displayed in the network setting UI in FIG. 11.

When the network setting UI is displayed on the DFE 121 and when the MFP 122 has a plurality of I/Fs, the UI display unit 311 is able to perform a process similar to the UI masking process in FIG. 12.

As described above, the third embodiment is able to integrate the network setting operations for the DFE 121 and MFP 122 to one apparatus when the DFE is connected to the MFP 122. This prevents a user from changing the network configuration unintentionally by the other apparatus.

Next, a fourth embodiment of the present invention will be described using FIG. 13.

Figure 13:
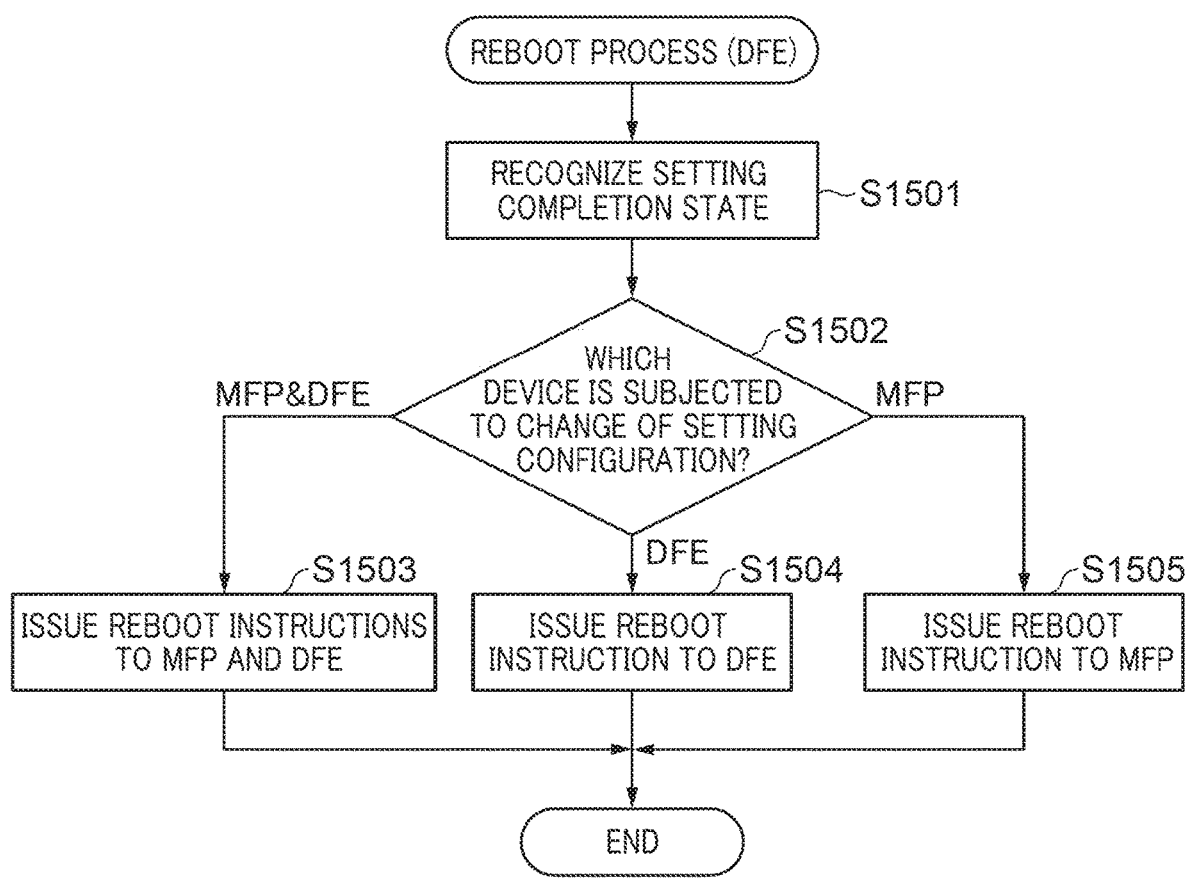
FIG. 13 is a flowchart showing a reboot process in a DFE concerning a fourth embodiment.

FIG. 13 is a flowchart showing a reboot process in the DFE 121 concerning the fourth embodiment.

A control program of the reboot process described in FIG. 13 is stored in the ROM 212 of the DFE 121, is read to the RAM 213, and is run by the CPU 211.

The network setting module 310 recognizes a setting completion state in step S1501. This state shows that the changes of the network configuration of the DFE 121 and MFP 122 in the steps S704 through S706 in FIG. 7 have succeeded. The changed network configurations are not reflected until rebooting the apparatuses.

The network setting module 310 determines which apparatus is subjected to the change of the setting configuration in step S1502. When the network configurations of both of the DFE 121 and MFP 122 are changed, the process proceeds to step S1503. When the network configuration of the DFE 121 is changed, the process proceeds to step S1504. When the network configuration of the MFP 122 is changed, the process proceeds to step S1505.

The network setting module 310 issues reboot instructions to the DFE 121 and MFP 122 in the step S1503. It should be noted that the reboot instruction to the MFP 122 is transmitted to the MFP 122 through the second network 102, and the MFP122 reboots when the reboot instruction is received.

The network setting module 310 issues the reboot instruction to only the DFE 121 in the step S1504.

The network setting module 310 issues the reboot instruction to only the MFP 122 in the step S1505. It should be noted that the reboot instruction to the MFP 122 is transmitted to the MFP 122 through the second network 102, and the MFP122 reboots when the reboot instruction is received.

It should be noted that the network setting module 510 can perform the same reboot process even when the network configurations of the DFE 121 and MFP 122 are set on the MFP 122.

As described above, the fourth embodiment enables to appropriately reboot an apparatus that the user instructs change of the network configuration. This simplifies the processes, such as a configuration change and management, because both of the DFE 121 and MFP 122 are rebooted to reflect the changed network configuration when the user instructs change of the network configurations of both the apparatuses from one of the DFE 121 and MFP 122.

Next, a fifth embodiment of the present invention will be described using FIG. 14 and FIG. 15. FIG. 14 is a view showing an example of a network setting UI displayed on the DFE 121 concerning the fifth embodiment. FIG. 15 is a flowchart showing a network configuration changing process in the DFE 121 concerning the fifth embodiment.

A control program of the network configuration changing process described in FIG. 15 is stored in the ROM 407 of the MFP 122, is read to the RAM 403, and is run by the CPU 402.

Figure 22:
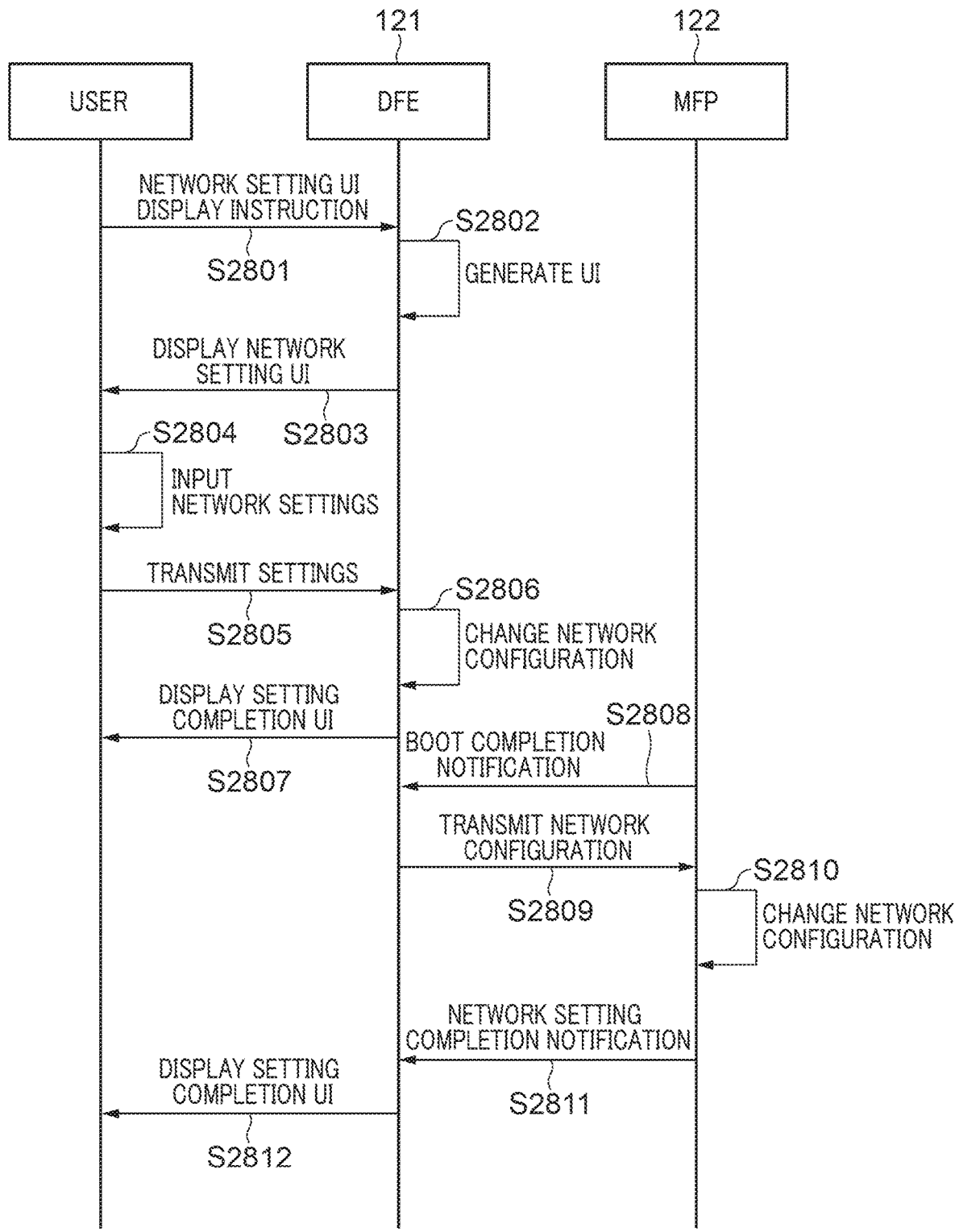
FIG. 22 is a sequence chart showing a flow of the network setting process in the fifth embodiment.

FIG. 22 is a sequence chart showing a flow of a network setting process in the fifth embodiment.

At the DFE side, the control program of the network setting process described in FIG. 22 is stored in the ROM 212 of the DFE 121, is read to the RAM 213, and is run by the CPU 211. Moreover, at the MFP side, the control program is stored in the ROM 407 of the MFP 122, is read to the RAM 403, and is run by the CPU 402.

The entire flow of the fifth embodiment will be described using FIG. 22. A user instructs the DFE 121 to display the setting UI including the network setting UI (step S2801).

When receiving the display instruction of the step S2801, the DFE 121 generates the network setting UI in FIG. 6 on the basis of the current network configuration of the DFE 121 in step S2802. Since the DEF 121 cannot communicate with the MFP 122 until receiving a boot completion notification from the MFP 122 in step S2808 mentioned below, the columns of the network settings of the MFP 122 are blank in the generated network setting UI. Moreover, a message showing that the settings about the MFP 122 are reflected after boot of the MFP 122 is displayed.

The DFE 121 displays the network setting UI on the display/operation device 220 in step S2803.

The user inputs the network settings to the network setting UI displayed on the display/operation device 220 and selects the setting completion button in step S2804.

When detecting the selection of the setting completion button by the user in step S2805, the DFE 121 determines that the input of the network settings by the user has been completed and receives the network settings input into the network setting UI.

In step S2806, the DFE 121 changes the network configuration according to the network settings about the DFE 121 from among the network settings received in the step S2805. It should be noted that the DFE 121 cannot communicate with the MFP 122 until receiving the boot completion notification from the MFP 122 in step S2808 mentioned later. Accordingly, the DFE 121 cannot transmit the network configuration about the MFP 122 to the MFP 122. Accordingly, the DFE 121 holds the network configuration about the MFP 122 input in the step S2804. Strictly speaking, the DFE 121 only obtains the changed network settings in this stage and the changed network settings will be reflected to the network configuration after rebooting the DFE 121.

In step S2807, the DFE 121 displays a message showing that the network setting operation for the DFE 121 has been completed on the display/operation device 220.

In the step S2808, the MFP 122 notifies the DFE 121 that the boot has been completed.

In step S2809, the DFE 121 ascertains the connection of the MFP 122 by the above-mentioned notification and transmits the network configuration about the MFP 122 that is input in the step S2804 and is held inside to the MFP 122.

In step S2810, the MFP 122 changes the network configuration into the network configuration received in the step S2809. Strictly speaking, the MFP 122 only obtains the changed network settings in this stage and the changed network settings will be reflected to the network configuration after rebooting the MFP 122.

The MFP 122 notifies the DFE 121 that the setting has been completed by transmitting the setting completion notification.

When receiving the setting completion notification transmitted from the MFP 122 in the step S2811, the DFE 121 displays a message showing that the network setting operation for the MFP 122 has been completed on the display/operation device 220, and this process is completed.

Next, a network configuration changing process executed in the DFE 121 in the fifth embodiment will be described using a flowchart shown in FIG. 15. This process corresponds to the steps S2808 and S2809 in FIG. 22.

The network setting module 310 ascertains a connection state of the MFP 122 by checking whether the MFP 122 is connected in step S1701. Specifically, as described concerning the step S2808 in FIG. 22, when receiving the boot completion notification from the MFP 122, the DFE 121 ascertains that the MFP 122 is connected. However, the ascertaining method is not limited to the above method as long as it is possible to check whether the MFP 122 is in a state where the network configuration is changeable. For example, the DFE 121 may periodically request the notification about the connection state from the MFP 122 after receiving the network configuration input into the network setting UI by the user in the step S2805 in FIG. 11 until receiving a response from the MFP 122. In this case, the connection state of the MFP 122 is ascertained by the presence of the response to the notification request from the MFP 122.

When ascertaining that the MFP 122 has been connected in the step S1701, the network setting module 310 proceeds with the process to step S1702 and transmits the network configuration of the MFP 122 that the user input into the network setting UI at the side of the DFE 121 to the MFP 122. Thereby, the network setting module 310 changes the network configuration of the MFP 122.

In the meantime, when ascertaining that the MFP 122 is not connected in the step S1701, the network setting module 310 holds the setting values of the network configuration as-is and finishes this process.

It should be noted that the network setting module 310 ascertains connection of the MFP 122 whenever the user opens the network setting UI at the side of the DFE 121 while holding the setting values of the network configuration about the MFP 122. As a result, when it is ascertained that the MFP 122 is not connected to the DFE 121, a message showing that the network configuration about the MFP 122 will be reflected after connecting with the MFP 122 is displayed in the network setting UI as exemplified in FIG. 14. That is, the user is notified that the network configuration about the MFP 122 that the user input into the network setting UI will be reflected after the MFP 122 shifts to a state that is capable of changing the network configuration.

The network setting module 510 may set the network configurations of the DFE 121 and MFP 122 by displaying the network setting UI on the MFP 122 in the same manner as the network configuration changing process in FIG. 15. Also in this case, the MFP 122 ascertains the connection of the DFE 121 whenever the user opens the network setting UI at the side of the MFP 122 while holding the setting values of the network configuration about the DFE 121. As a result, when it is ascertained that the DFE 121 is not connected to the MFP 122, a UI that is configured by adding the software keyboard to the network setting UI in FIG. 14 is displayed on the MFP 122. This is because the MFP 122 receives an operation through the touch panel.

As mentioned above, in the fifth embodiment, when the user inputs the network configurations of the DFE 121 and MFP 122 into a UI of one of the apparatuses, the network configuration of the other apparatus is changed after ascertaining that both apparatuses have been connected. Thereby, the user is able to instruct change of the network configurations of both apparatuses without waiting for the boot of the other apparatus.

Figures 16, 17:
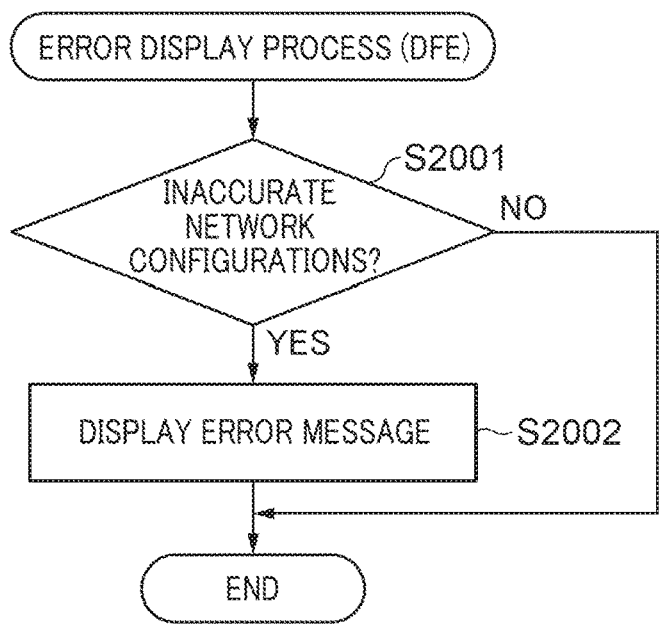
FIG. 16 is a view showing an example of a network setting UI displayed on a DFE concerning a sixth embodiment.
FIG. 17 is a flowchart showing an error display process at a time of a network setting in the DFE concerning the sixth embodiment.

Next, a sixth embodiment of the present invention will be described using FIG. 16 and FIG. 17. FIG. 16 is a view showing an example of a network setting UI displayed on the DFE 121 concerning the sixth embodiment. FIG. 17 is a flowchart showing an error display process at a time of the network setting operation in the DFE 121 concerning the sixth embodiment.

A control program of the error display process at the time of the network setting operation described in FIG. 17 is stored in the ROM 212 of the DFE 121, is read to the RAM 213, and is run by the CPU 211.

When a user presses the setting completion button (FIG. 6), the UI display unit 311 analyzes the network configurations received on the network setting UI (FIG. 6) in step S2001 and determines whether the analyzed network configurations are inaccurate.

When the network configurations analyzed in the step S2001 are determined to be inaccurate, the UI display unit 311 switches the UI in FIG. 6 to a UI including an error message in FIG. 16, notifies the user of warning, and finishes this process. In the meantime, the network configurations are not inaccurate, this process is finished as-is.

The inaccurate network configurations obstruct correct operations of the DFE 121 and MFP 122 on the network. For example, when the DFE 121 and MFP 122 are connected to the same network, a case where the same (competing) IP address is set to both apparatuses can be exemplified. Moreover, since the network parts of the IP addresses never become identical when the DFE 121 and MFP 122 are connected to different networks, a case where both apparatuses are connected to the same subnet can be exemplified.

Accordingly, the criteria for determining whether the network configuration is inaccurate may be changed according to whether the DEF 121 and MFP 122 are connected to the same network. It should be noted that the problem of whether the DFE 121 and MFP 122 are connected to the same network may be determined by a user from the network setting UI or may be determined using a setting held internally.

The UI display module 511 may execute an error display process similar to the process in FIG. 17 by displaying the network setting UI (FIG. 8) at the side of the MFP 122. At that time, when the network configurations are inaccurate, the network setting UI on the MFP 122 is switched from the UI in FIG. 8 to a UI that is configured by adding the software keyboard to the network setting UI in FIG. 16, and an error message is displayed.

As described above, the sixth embodiment analyzes the network configurations of the DFE 121 and MFP 122 that the user input and displays the error message when the network configurations are inaccurate. Thereby, even if a user mistakes inputs of the network configurations of the DFE 121 and MFP 122 on the network setting UI, the user is able to correct promptly.

Next, a seventh embodiment of the present invention will be described using FIG. 18, FIG. 19, and FIG. 20.

Figure 18:
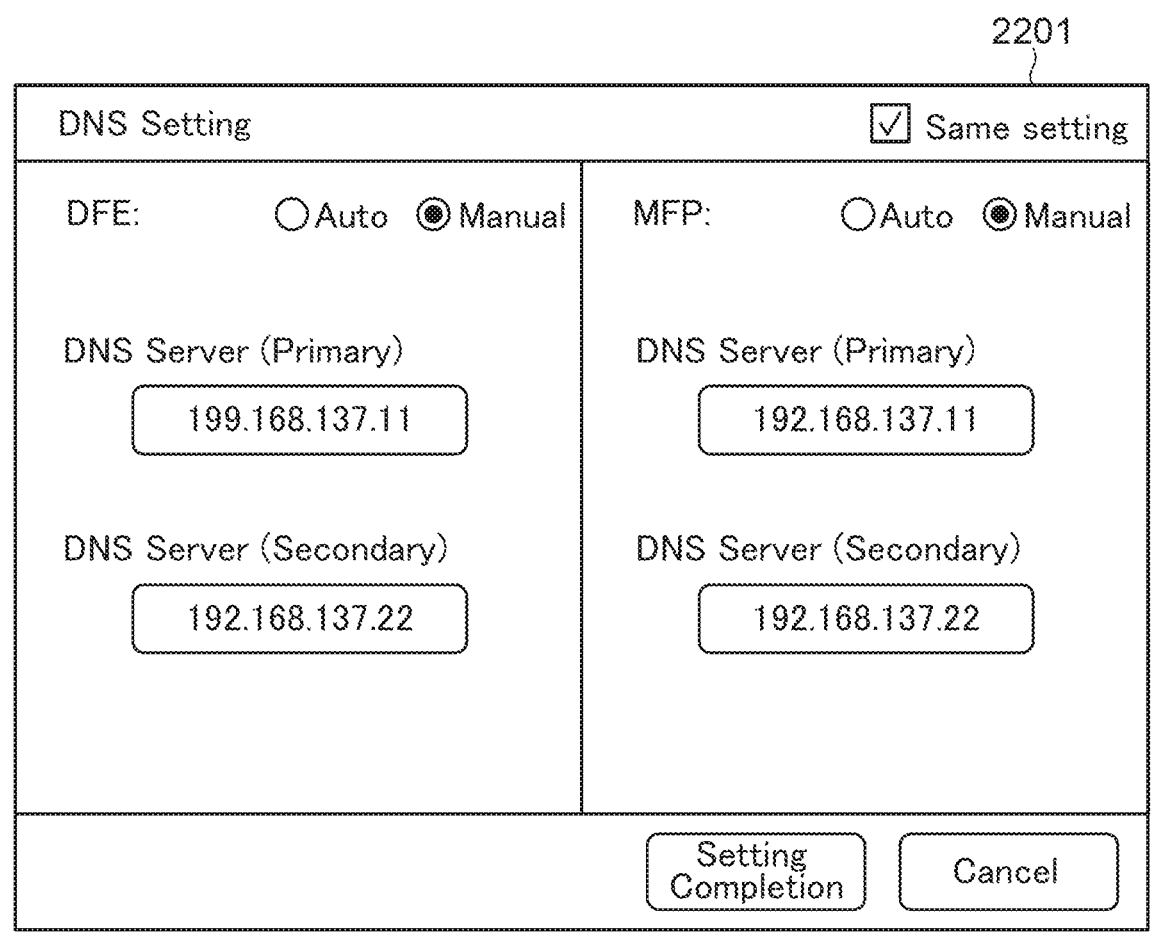

FIG. 18 is a view showing an example of a network setting UI displayed on the DFE 121 concerning the seventh embodiment.

FIG. 19 is a view showing a modified example of the network setting UI displayed on the DFE 121 concerning the seventh embodiment.

Figure 20:
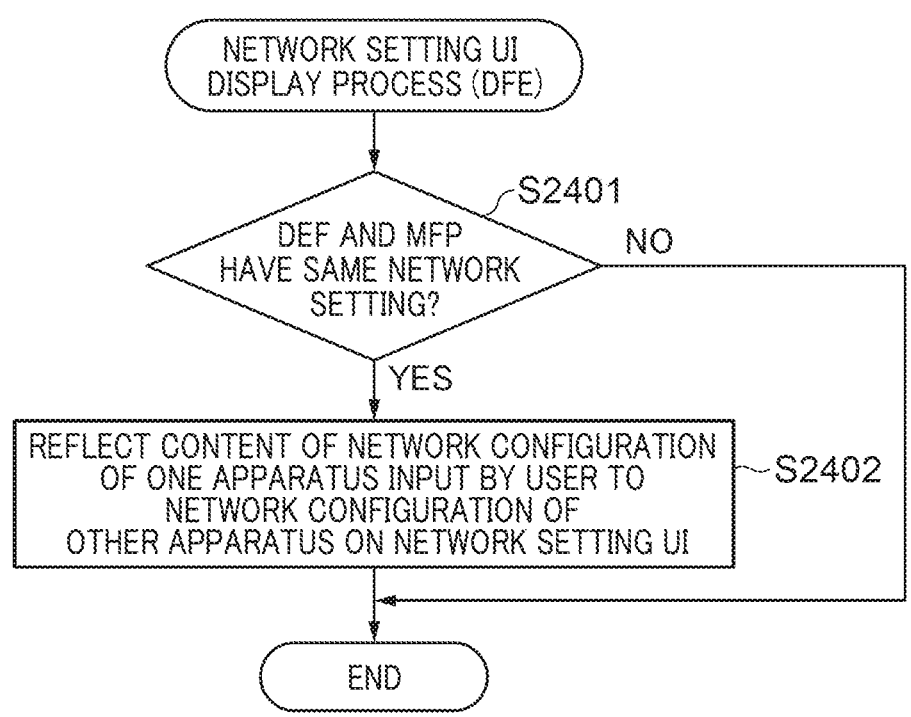
FIG. 20 is a flowchart showing a network setting UI display process in the DFE concerning the seventh embodiment.

FIG. 20 is a flowchart showing a network setting UI display process in the DFE 121 concerning the seventh embodiment.

A control program of the network setting UI display process described in FIG. 20 is stored in the ROM 212 of the DFE 121, is read to the RAM 213, and is run by the CPU 211.

The UI display unit 311 determines whether the DFE 121 and MFP 122 have the same network setting in step S2401. As a result of the determination, when the DFE 121 and MFP 122 have the same network setting, the process proceeds to step S2402. When the DFE 121 and MFP 122 do not have the same network setting, this process is finished as-is.

The UI display module 311 reflects the information that the user input on the network setting UI about one of the DFE 121 and MFP 122 to the information on the network setting UI about the other apparatus for the same network setting in the step S2402. Then, this process is finished.

Specifically, when the DFE 121 and MFP 122 are connected to the same subnet, and when the DFE 121 and MFP 122 use the same DNS server or the same WINS server, it is determined that the DFE 121 and MFP 122 have the same network setting. For example, when the user selects a check box indicating that the settings of the DFE 121 and MFP 122 about the DNS server and WINS server are identical on the network setting UI shown in FIG. 18, it is determined that the DFE 121 and MFP 122 have the same network setting in the step S2401. In this case, when the user inputs a value into the network setting column for one of the DFE 121 and MFP122 on the network setting UI shown in FIG. 18, a content in the corresponding network setting column for the other apparatus will be changed to the value that the user input.

Similarly, when the user selects a check box indicating that the DFE 121 and MFP 122 are connected to the same subnet on the network setting UI shown in FIG. 19, it is determined that the DFE 121 and MFP 122 have the same network setting in the step S2401. In this case, when the user inputs a value into the network setting column for one of the DFE 121 and MFP122 on the network setting UI shown in FIG. 19, a display of the subnet mask in the corresponding network setting column for the other apparatus will be changed to the value that the user input. The problem of whether the apparatuses have the same network setting may be determined on the basis of the user's selection of the check box on the network setting UI in FIG. 18 or FIG. 19. The problem may be determined on the basis of a condition established by another method.

The UI display module 511 may execute a network setting UI display process similar to the process in FIG. 20 by displaying the network setting UI at the side of the MFP 122. In that time, a UI that is configured by adding the software keyboard to the network setting UI in FIG. 18, or a UI that is configured by adding the software keyboard to the network setting UI in FIG. 19 is displayed on the MFP 122 as the network setting UI. This is because the MFP 122 receives an operation through the touch panel.

As described above, in the seventh embodiment, when the DFE 121 and MFP 122 have the same network setting, a user is able to omit the input of the same setting. Thereby, since a user is not required to input the same value repeatedly, the convenience of the print system is improved.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-247764, filed Dec. 28, 2018, which is hereby incorporated by reference herein in its entirety.

What is claimed is:

1. A print system comprising:
a first network that connects first and second information processing apparatuses to an external apparatus;
a second network that connects the first information processing apparatus to the second information processing apparatus in order to transmit information for print management;
the second information processing apparatus comprising:
a memory device that stores a set of instructions; and
at least one processor that executes the set of instructions to:
display a first setting screen on which a user inputs network configurations of the first and second information processing apparatuses for the first network;
change the network configuration of the second information processing apparatus for the first network into the network configuration input by the user in a case where the user inputs the network configuration of the second information processing apparatus for the first network on the first setting screen; and
transmit the network configuration input by the user to the first information processing apparatus through the second network in a case where the user inputs the network configuration of the first information processing apparatus for the first network on the first setting screen; and
the first information processing apparatus comprising:
a memory device that stores a set of instructions; and
at least one processor that executes the set of instructions to change the network configuration of the first information processing apparatus for the first network into the network configuration transmitted in a case where the network configuration is transmitted from the second information processing apparatus through the second network.

2. The print system according to claim 1, wherein the at least one processor of the second information processing apparatus executes instructions in the memory device to:
obtain the network configuration of the first information processing apparatus through the second network, and
display a second setting screen on which a user inputs the network configuration of the second information processing apparatus for the first network in a case where the network configuration obtained is set to use one network interface.

3. The print system according to claim 1, wherein the at least one processor of the first information processing apparatus executes instructions in the memory device to:
display a third setting screen on which a user inputs the network configuration of the first information processing apparatus for the first network, and
disable a user input on the third setting screen in a case where both of a first connector for connecting to the first network and a second connector for connecting to the second network are available.

4. The print system according to claim 3, wherein the at least one processor of the first information processing apparatus executes instructions in the memory device to display the third setting screen in a state where all user input columns are masked in a case where the user instructs display of the third setting screen while the user input on the third setting screen is disabled.

5. The print system according to claim 3, wherein the at least one processor of the first information processing apparatus executes instructions in the memory device to display a message showing that the user input on the third setting screen is impossible in a case where the user instructs display of the third setting screen while the user input on the third setting screen is disabled.

6. The print system according to claim 1, wherein the at least one processor of the first information processing apparatus executes instructions in the memory device to:
display a fourth setting screen on which a user inputs network configurations of the first and second information processing apparatuses for the first network,
change the network configuration of the first information processing apparatus for the first network into the network configuration of the first information processing apparatus input by the user on the fourth setting screen, and
transmit the network configuration of the second information processing apparatus for the first network input by the user on the fourth setting screen to the second information processing apparatus through the second network,
wherein the at least one processor of the second information processing apparatus executes instructions in the memory device to change the network configuration of the second information processing apparatus for the first network into the network configuration transmitted in a case where the network configuration is transmitted from the first information processing apparatus through the second network.

7. The print system according to claim 1, wherein the at least one processor of the second information processing apparatus executes instructions in the memory device to:
transmit a reboot instruction to at least one of the first and second information processing apparatuses of which the network configuration has been changed, and
reboot the second information processing apparatus in a case where the reboot instruction is transmitted,
wherein the at least one processor of the first information processing apparatus executes instructions in the memory device to reboot the first information processing apparatus in a case where the reboot instruction is transmitted.

8. The print system according to claim 1, wherein the at least one processor of the second information processing apparatus executes instructions in the memory device to:
ascertain whether the first information processing apparatus unit is in a state that is capable of changing the network configuration,
hold the network configuration of the first information processing apparatus for the first network input by the user on the first setting screen without transmitting in a case where it is ascertained that the first information processing apparatus is in a state that is not capable of changing the network configuration,
transmit the network configuration held to the first information processing apparatus through the second network in a case where it is ascertained that the first information processing apparatus shifts to the state that is capable of changing the network configuration.

9. The print system according to claim 8, wherein the at least one processor of the second information processing apparatus executes instructions in the memory device to notify the user that the network configuration of the first information processing apparatus for the first network input by the user on the first setting screen is transmitted after the first information processing apparatus shifts to the state that is capable of changing the network configuration in the case where it is ascertained that the first information processing apparatus is in the state that is not capable of changing the network configuration.

10. The print system according to claim 1, wherein the at least one processor of the second information processing apparatus executes instructions in the memory device to:
analyze the network configurations of the first and second information processing apparatuses for the first network input by the user on the first setting screen; and
notify the user of warning in a case where the network configurations analyzed are inaccurate.

11. The print system according to claim 1, wherein the at least one processor of the second information processing apparatus executes instructions in the memory device to:
determine whether the first and second information processing apparatus have a same network setting; and
reflect information input by the user on the first setting screen about one of the first and second information processing apparatuses to information on the first setting screen about another apparatus for the same network setting in a case where it is determined to have the same network setting.

12. The print system according to claim 1, wherein the first information processing apparatus comprises a print processing apparatus and the second information processing apparatus comprises a printer controller.

13. The print system according to claim 1, wherein the first information processing apparatus comprises a printer controller and the second information processing apparatus comprises a print processing apparatus.

14. An information processing apparatus comprising:
a first connector that connects to another information processing apparatus and an external apparatus mutually through a first network;
a second connector that connects to the other information processing apparatus through a second network that is used to transmit information for print management;
a memory device that stores a set of instructions: and
at least one processor that executes the set of instructions to:
display a first setting screen on which a user inputs network configurations of the information processing apparatus and the other information processing apparatus for the first network;
change the network configuration of the information processing apparatus for the first network into the network configuration input by the user in a case where the user inputs the network configuration of the information processing apparatus for the first network on the first setting screen; and
transmit the network configuration input by the user to the other information processing apparatus through the second network in a case where the user inputs the network configuration of the other information processing apparatus for the first network on the first setting screen.

15. The information processing apparatus according to claim 14, wherein the information processing apparatus comprises a print processing apparatus and is connected to the other information processing apparatus that comprises a printer controller.

16. The information processing apparatus according to claim 14, wherein the information processing apparatus comprises a printer controller and is connected to the other information processing apparatus that comprises a print processing apparatus.

17. A control method for a print system in which first and second information processing apparatuses are connected to an external apparatus through a first network and the first information processing apparatus is connected to the second information processing apparatus through a second network that is used to transmit information for print management, the control method comprising:
displaying a first setting screen on which a user inputs network configurations of the first and second information processing apparatuses for the first network on the second information processing apparatus;
changing the network configuration of the second information processing apparatus for the first network into the network configuration input by the user in the second information processing apparatus in a case where the user inputs the network configuration of the second information processing apparatus for the first network on the first setting screen;
transmitting the network configuration input by the user to the first information processing apparatus from the second information processing apparatus through the second network in a case where the user inputs the network configuration of the first information processing apparatus for the first network on the first setting screen; and
changing the network configuration of the first information processing apparatus for the first network into the network configuration transmitted in the first information processing apparatus in a case where the network configuration is transmitted through the second network.

18. A control method for an information processing apparatus that is connected to another information processing apparatus and an external apparatus through a first network and is connected to the other information processing apparatus through a second network that is used to transmit information for print management, the control method comprising:
displaying a first setting screen on which a user inputs network configurations of the information processing apparatus and the other information processing apparatus for the first network;
changing the network configuration of the information processing apparatus for the first network into the network configuration input by the user in a case where the user inputs the network configuration of the information processing apparatus for the first network on the first setting screen; and
transmitting the network configuration input by the user to the other information processing apparatus for the first network through the second network in a case where the user inputs the network configuration of the other information processing apparatus for the first network on the first setting screen.

19. A non-transitory computer-readable storage medium storing a control program causing a computer to execute a control method for a print system in which first and second information processing apparatuses are connected to an external apparatus through a first network and the first information processing apparatus is connected to the second information processing apparatus through a second network that is used to transmit information for print management, the control method comprising:

displaying a first setting screen on which a user inputs network configurations of the first and second information processing apparatuses for the first network on the second information processing apparatus;

changing the network configuration of the second information processing apparatus for the first network into the network configuration input by the user in the second information processing apparatus in a case where the user inputs the network configuration of the second information processing apparatus for the first network on the first setting screen;

transmitting the network configuration input by the user to the first information processing apparatus from the second information processing apparatus through the second network in a case where the user inputs the network configuration of the first information processing apparatus for the first network on the first setting screen; and changing the network configuration of the first information processing apparatus for the first network into the network configuration transmitted in the first information processing apparatus in a case where the network configuration is transmitted through the second network.

20. A non-transitory computer-readable storage medium storing a control program causing a computer to execute a control method for an information processing apparatus that is connected to another information processing apparatus and an external apparatus through a first network and is connected to the other information processing apparatus through a second network that is used to transmit information for print management, the control method comprising:

displaying a first setting screen on which a user inputs network configurations of the information processing apparatus and the other information processing apparatus for the first network;

changing the network configuration of the information processing apparatus for the first network into the network configuration input by the user in a case where the user inputs the network configuration of the information processing apparatus for the first network on the first setting screen; and transmitting the network configuration input by the user to the other information processing apparatus for the first network through the second network in a case where the user inputs the network configuration of the other information processing apparatus for the first network on the first setting screen.

* * * * *